United States Patent [19]

Hester et al.

[11] Patent Number: 5,166,626
[45] Date of Patent: Nov. 24, 1992

[54] ELECTRICAL CAPACITANCE CLEARANCEOMETER

[75] Inventors: Norbert J. Hester, Cincinnati; Charles E. Hornbeck, West Chester; Joseph C. Young, Cincinnati, all of Ohio

[73] Assignee: General Electric Company, Cincinnati, Ohio

[21] Appl. No.: 530,052

[22] Filed: May 29, 1990

[51] Int. Cl.$^5$ .............................................. G01R 27/26
[52] U.S. Cl. ..................................... 324/690; 324/683
[58] Field of Search ............... 324/662, 686, 690, 663, 324/671, 688, 674, 681, 675, 683, 233

[56] References Cited

U.S. PATENT DOCUMENTS

| | | | |
|---|---|---|---|
| 2,842,738 | 7/1958 | Warnick | 324/61 |
| 3,805,150 | 4/1974 | Abbe | 324/662 |
| 3,826,980 | 7/1974 | Diechelmann et al. | 324/663 |
| 4,063,167 | 12/1977 | Duly | 324/671 |
| 4,329,644 | 5/1982 | Libertini et al. | 324/160 |
| 4,568,873 | 2/1986 | Oyanagi et al. | 324/688 |
| 4,804,905 | 2/1989 | Ding et al. | 324/61 P |
| 4,806,848 | 2/1989 | Demers | 324/61 R |
| 4,813,273 | 3/1989 | Parsons | 73/118.1 |
| 4,818,948 | 4/1989 | Dooley | 324/61 P |
| 4,823,071 | 4/1989 | Ding et al. | 324/662 |

FOREIGN PATENT DOCUMENTS 2071852 8/1981 United Kingdom .

OTHER PUBLICATIONS

Electronics, p. 147, May 1953.

Primary Examiner—Kenneth A. Wieder
Assistant Examiner—Maura K. Regan
Attorney, Agent, or Firm—Jerome C. Squillaro; Bernard E. Shay

[57] ABSTRACT

A hot gas turbine engine capacitive probe clearanceometer is employed to measure the clearance gap or distance between blade tips on a rotor wheel and its confining casing under operating conditions. A braze sealed tip of the probe carries a capacitor electrode which is electrically connected to an electrical inductor within the probe which is inserted into a turbine casing to position its electrode at the inner surface of the casing. Electrical power is supplied through a voltage controlled variable frequency oscillator having a tuned circuit in which the probe is a component. The oscillator signal is modulated by a change in electrical capacitance between the probe electrode and a passing blade tip surface while an automatic feedback correction circuit corrects oscillator signal drift. A change in distance between a blade tip and the probe electrode is a change in capacitance therebetween which frequency modulates the oscillator signal. The modulated oscillator signal which is then processed through a phase detector and related circuitry to provide an electrical signal is proportional to the clearance gap.

14 Claims, 2 Drawing Sheets

ELECTRICAL CAPACITANCE CLEARANCEOMETER

This invention herein described was made in the performance of work under a NASA contract and is subject to the provisions of Section 305 of the National Aeronautics and Space Act of 1958, Public Law 85-568 (72 Stat. 435; 42 USC 2457).

This invention relates to an electrical capacitance clearanceometer, and more particularly to an electrical capacitance change measuring system particularly adapted to measure clearance between fixed and adjacent moving parts within a machine as a function of electrical capacitance changes between the parts.

BACKGROUND OF THE INVENTION

In various rotating machines, a rotor or rotating member is closely confined within a housing or casing, and it is imperative that the gap or distance between the casing and the rotating member, referred to as running clearance, be maintained within predetermined limits for safe and effective operation of the machine. One example of such a machine, and one to which this invention is particularly applicable, is a hot gas turbine engine such as an aircraft gas turbine engine. In such an engine, a turbine wheel or rotor having a circumferential row of spaced apart vanes or blades extending therefrom is closely confined within an encircling housing or casing to define a hot gas flow path transversely through the row of blades. Reaction of the blades to the hot gas flow causes rotation of the turbine wheel and appropriate power generation.

It is important in such hot gas turbine engines that the running clearance or gap between the ends or tips of the blades on the wheel or rotor and the encircling housing be maintained within proscribed minimum limits for greater efficiency. The loss of turbine blade reaction from hot gas leakage or bypass through the running clearance space, instead of between turbine blades represents a potential power loss. However, preservation of a minimum clearance gap during engine operation is instrumental in avoiding significant rotational contact of the blades with the encircling casing which may rapidly lead to failure of engine components as well as the engine as an effective power plant. For these reasons it has become a practice to measure the running clearance of a turbine wheel during its operation and to have a continuous measuring or monitoring system for the running clearance during certain predetermined operations of the turbine. Various operating characteristics of a hot gas turbine engine provide significant difficulties to the use of various known gap and distance measuring devices, particularly those requiring actual contact with a moving member. For example, the environment of the high speed turbine blades is hostile to measuring devices, reaching extreme temperatures in excess of 1200° F. in the presence of a hot, contaminating, and corrosive gas stream. This extreme temperature range causes significant differential expansion of numerous turbine component parts which affects not only any associated measuring means, but also the running clearance gap or distance being measured.

Because of the high speed of the turbine wheel, the described hostile environment, and the openness or spacing of the blades on the rotor, measuring devices or systems requiring contact with the rotor or blades have generally been avoided. With respect to non-contact measuring means, various electrical capacitance systems have been developed to measure the running clearance of hot gas turbine wheels and compressor rotors during their operation.

In these prior electrical capacitance systems, a probe member with a sensor end thereon is inserted in an appropriate aperture in a turbine rotor housing, for example, so that the sensor end of the probe is exposed to passing tips of the turbine blades. The sensor end of the probe adjacent the moving blades is fitted with an electrical capacitor electrode which may be positioned near or at the inner surface of the closely confining casing or housing around the turbine wheel. In this position the probe electrode represents one side of a running clearance gap. The tip surface of a turbine blade, at electrical ground potential is gainfully employed as an opposite capacitor electrode, and the other side of the running clearance gap. A change in the clearance gap is a change in the distance between capacitor electrodes and a change in electrical capacitance therebetween. A variance or change in electrical capacitance, by an increase or decrease in the clearance gap from a predetermined value is measured and correlated by appropriate electrical circuitry to indicate a dimensional change in the distance between the tip surface of a turbine blade, and the closely encircling housing represented by the probe electrode.

As previously described, the probe member, and particularly the sensor electrode part thereof, is positioned in a very hostile environment of high temperatures in the presence of contaminating hot combustion gases from the combustion system of the engine, conditions which contribute to early probe deterioration resulting in, for example, a decrease in sensitivity and accuracy. As a consequence of the above noted factors, continuing efforts are expended to provide electrical capacitance probes and circuitry which are more highly resistant to temperature extremes and contamination, and which have increased sensitivity, accuracy and stability.

OBJECTS OF THE INVENTION

It is an object of this invention to provide an improved high temperature and contamination resistant electrical capacitance clearanceometer.

It is another object of this invention to provide an improved high sensitivity and electrically stable capacitance probe and an improved phase detection electrical circuit therefore for use as an electrical capacitance measuring clearanceometer system.

It is a further object of this invention to provide an improved electrical capacitance clearanceometer probe utilizing a braze sealed gas tight sensor unit to prevent egress therein of contaminants, and selective metals and ceramics in the sensor unit for temperature stability.

SUMMARY OF THE INVENTION

An improved capacitance type probe member and electrical circuit therefor are disclosed in which the probe member is particularly adapted to be inserted in a turbine or compressor casing of an aircraft gas turbine engine with a sensor and thereof being closely adjacent a turbine or compressor wheel periphery. The probe includes a hollow water cooled heat at its proximal end which contains a temperature sensitive electrical component of the electrical measuring circuit and an opposite sensor end. The sensor end of the probe includes a metal-ceramic composite structure with a capacitor sensor electrode braze joined to a ceramic insulator and comprises a gas tight braze sealed combination of materials found to be of superior gas turbine heat and corrosion resistant characteristics together with temperature charcteristics complementarily matched to each other. A coaxial electrical cable passing into the probe is utilized to electrically interconnect the sensor electrode and an electrical capacitance measuring system circuit. The overall combination provides a highly accurate and stable electrical capacitance measuring system. A voltage controlled, automatic signal correcting, frequency modulated, high frequency electrical oscillator is connected to the probe sensor electrode and is frequency modulated by the capacitance reactance between the probe electrode and an opposite spaced blade tip at electrical ground potential. The modulated oscillator signal is passed through appropriate phase detection electrical circuitry to provide an electrical signal which is proportional to the distance between the probe electrode and an adjacent turbine blade tip surface.

This invention will be better understood when taken in connection with the following drawings and description.

DESCRIPTION OF A PREFERRED EMBODIMENT OF THIS INVENTION

Figure 1:
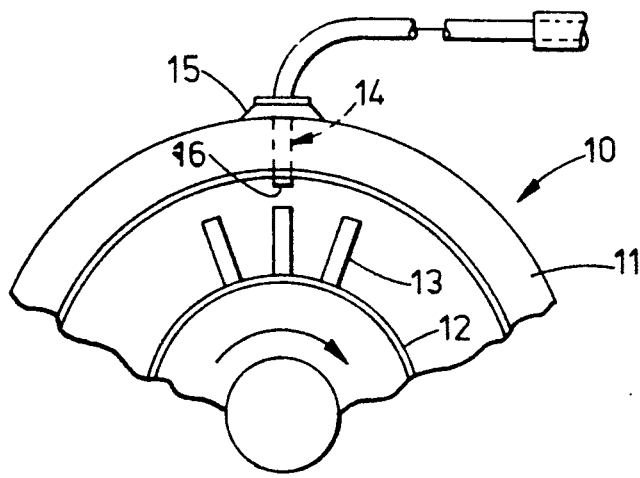
FIG. 1 is a schematic illustration of a capacitance probe mounted in a turbine housing.

A schematic illustration of one capacitance probe mounting application with a probe in its operative position is shown in FIG. 1.

Referring now to FIG. 1, a hot gas turbine engine 10 comprises a housing or casing 11 closely encircling a bladed turbine wheel 12 which is adapted for rotation in housing 11 by reacting with a hot gas stream which flows axially through the row of blades 13. For the reasons given, the running clearance or gap between the blade tips or free ends and the inner surface of the housing 11 should be maintained in a proscribed range. Probe 14 of this invention is positioned closely adjacent blades 13 of turbine wheel 12 and utilized to modulate an electrical signal from an associated electrical circuit. The modulated electrical signal is then processed to provide a further electrical signal proportional to the running clearance or gap between the ends of the turbine blades and the encircling housing. In FIG. 1, probe 14, shown in phantom, is inserted into casing 11 through an appropriate apertured casing mounting pad or pedestal 15. The inner end of probe 14 is fitted with an electrical capacitor electrode 16 at the inner surface of casing 11. The combination of a free end or exposed tip of a blade 13 and the probe electrode represents a pair of capacitor electrodes in spaced planar relationship separated by an air gap which is the running clearance gap of the turbine wheel with respect to casing 11. One preferred assembly for probe 14 is illustrated in FIG. 2.

Figure 2:
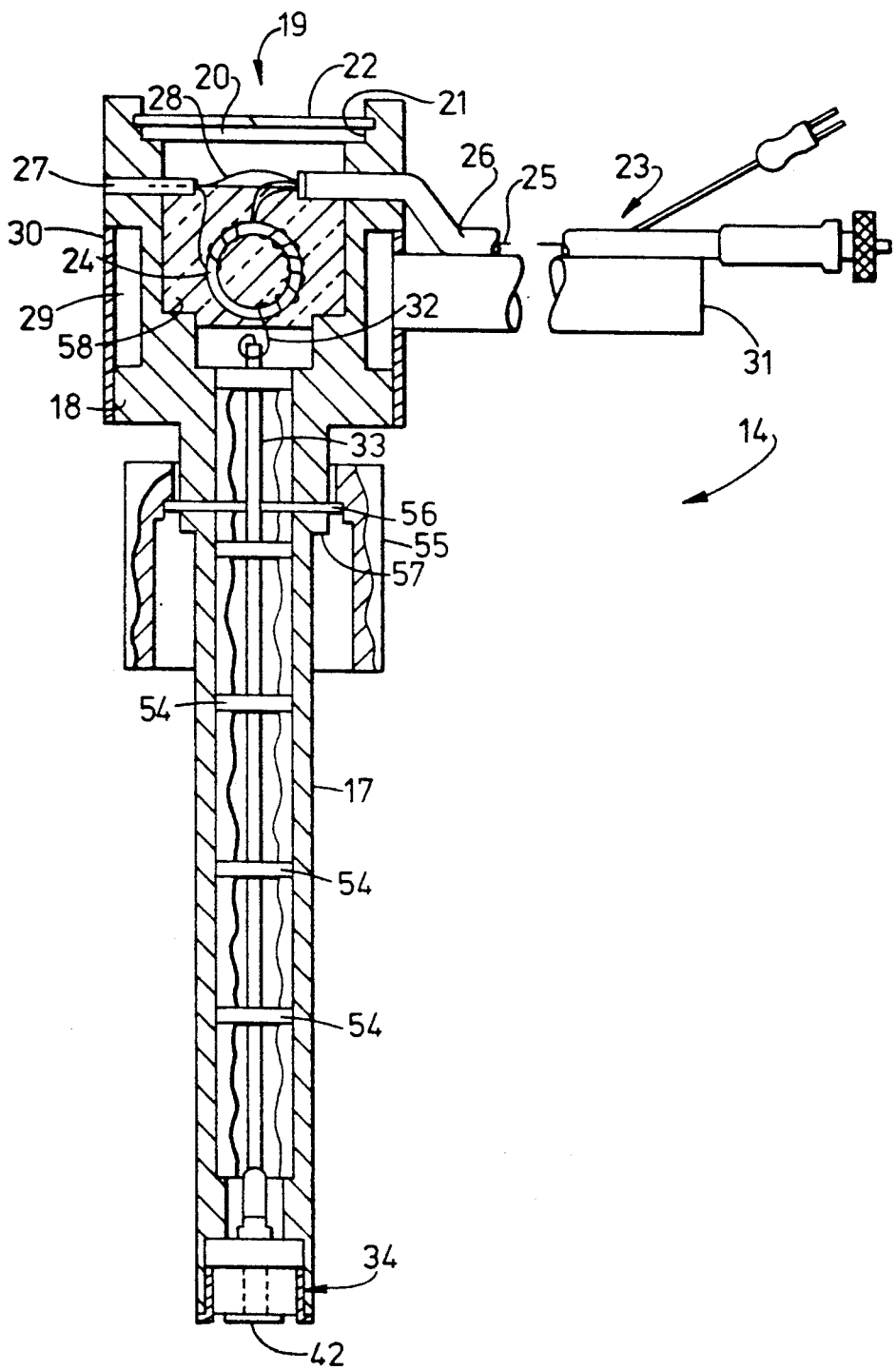
FIG. 2 is a schematic cross-sectional illustration of an improved probe of this invention for the application in FIG. 1.

Referring now to FIG. 2, probe 14 comprises a hollow cylindrical metal body 17 having an expanded open ended hollow cylindrical head 18 comprising the proximal end of cylindrical body 17. Open end 19 of hollow head 18 is closed off by a disc and lock ring combination comprising a disc cover 20 resting in groove 21 in the open end of head 18, and retained therein by a split or lock ring 22.

A coaxial electrical cable 23 passes transversely into head 18 and is electrically connected to a toroid electrical transformer or inductor 24 enclosed therein. Triaxial cable 23 comprises a central conductor 25 concentrically positioned in a surrounding spaced metal sheath 26. In one form of this invention the space between central conductor 25 and sheath 26 was filled with an electrically insulating mineral such as Teflon which has a high resistance to degradation of electrical characteristics from high temperatures and flexing forces. Cable 23 is considered a low noise low capacitance cable.

An electrical ground lead of inductor 24 is shown connected to an electrical ground strap 27 in head 18 and an electrical lead 28 from cable sheath 26 is also connected to strap 27.

Head 18 further includes an annular external channel 29 in the sidewall thereof. Channel 29 is closed or covered by a peripheral band cover 30 so that covered or closed channel 29 becomes a circular manifold around head 18. A fluid conduit 31 is connected through cover 30 to be in fluid flow connection with channel 29, and to a source of coolant fluid (not shown) such as water, for example. By the use of appropriate baffling in manifold 29, water is caused to circulate through manifold 29 and around head 18 to exit from a further conduit (not shown) peripherally spaced from conduit 31 about head 18. By this means head 18, and particularly inductor 24 therein are maintained at a temperature level which effectively shields inductor 24 from deleterious environmental temperature changes for increased electrical stability over a wide range of operating temperatures. Electrical stability is further increased by filling hollow head 18 with a high thermal conducting potting compound to fixedly position toroid inductor 24 in an optimum position with its plane parallel and coincident with the longitudinal axis of cylindrical body 17. An electrical output lead 32 of inductor 24 is electrically connected to a central connector wire or rod 33 which passes concentrically through probe body 17 to probe sensor tip 34 at the distal end of probe 14.

Sensor tip 34 is an important component of this invention and comprises a braze sealed composite structure of metal and ceramic parts arranged to support an appropriate electrical sensing electrode for the probe electrical measuring circuit while at the same time being effectively gas tight braze sealed over a wide range of operating temperatures. An effective gas tight seal at potential gas leak abutting surfaces prevents egress into the probe of contaminating combustion gases at elevated temperature which affects electrical sensitivity and stability of the probe. A more detailed illustration of the sensor tip end of probe 14 is illustrated in FIG. 3 which is an enlarged illustration for the purpose of clarity.

Figure 3:
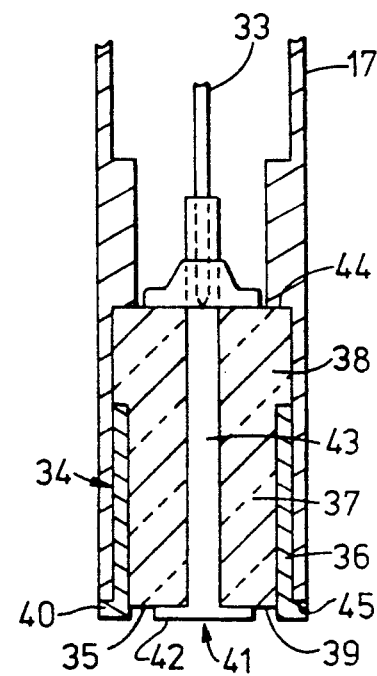
FIG. 3 is an enlarged schematic cross-sectional illustration of a preferred probe sensor tip of FIG. 2.

Referring now to FIG. 3, sensor tip 34 is a composite structure assembly comprising an electrically insulating insert 35 contained within a flanged or rimmed metal sleeve 36 and braze bonded therein.

In one practice of this invention insulating insert 35 comprised a metal oxide, for example, aluminum oxide ($Al_2O_3$) cylindrical body 37 having an expanded or enlarged cylindrical head part 38 at one end and a transverse planar base surface 39 at the other end. Aluminum oxide has thermal expansion characteristics with respect to its confining sleeve 36 so that the composite is temperature effective for use with a probe body 17 of a high temperature resistant metal such as an Inconel alloy, an alloy of principally iron, Fe, nickel, Ni, and chromium, Cr. Long life gas tight braze seals are best achieved when temperature expansion characteristics of abutting materials are closely matched or accommodating and are expeditiously brazed. For these reasons flanged sleeve 36 is a low expansion Kovar alloy sleeve, an alloy of principally nickel, Ni, cobalt, Co, Manganese, Mn, and iron, Fe. Sleeve 36 includes a radially extending flat rim or flange 40 at one end thereof. In assembly, insulator 35 fits concentrically in sleeve 36 with its expanded head overlapping the unflanged end of sleeve 36 and its cylindrical body 37 is metallize braze bonded to sleeve 36. Insulator 35 is also the principal carrier for a sensor capacitor electrode unit 41.

Sensor capacitor electrode unit 41 comprises a flat planar Kovar electrode section 42 having a hollow stem member 43 projecting perpendicularly from the plane of electrode section 42. Electrode section 42 is securely metallize braze bonded to surface 39 of insulator 36 in planar abutting relationship. This large area secure bonding reduces potential signal noise in the measuring circuit. Stem member 43 projects concentrically through insulator 35 into hollow probe body 17.

As illustrated in FIG. 3, the sensor or distal end of probe body 17 is a hollow cylindrical bore or annular end 45 with an internal peripheral insert stop shoulder 44 therein. Sleeve 36 together with insulator 35 therein is slidingly and concentrically inserted into probe body 17 until flange 40 abuts end 45 of body 17 and is peripherally attached to anmnular end 45 end by welding at the flange and body juncture. A metallize braze joint is also used between head 38 and probe body 17. As illustrated, hollow stem member 43 of capacitor electrode unit 41 extends into probe body 17 to receive therein the central wire or rod conductor 33 for a brazed electrical connection so that inductor 24 interconnects electrical capacitor electrode 42 with cable 23.

Probe body 17 projects into a turbine housing to take up a position similar to that of probe 14 of FIG. 1. In this position capacitor electrode 42 is positioned in planar spaced relationship from the tips of the turbine blades such as blades 13 of FIG. 1. Capacitor electrode 42 and a tip of a blade represent a pair of spaced capacitor electrodes which are electrically connected with a measuring circuit which senses changes in capacitance between the electrodes caused by a change in distance or gap between the electrodes, i.e. the running clearance, and provides an electrical signal which is proportional to the running clearance.

A rudimentary electrical circuit for the probe of this invention comprises, for example, a high frequency oscillator and a source of electrical power to provide an electrical signal to probe electrode 42. Probe 14 and inductor 24 are parts of a tuned circuit of the osciallator, and passing blade tips provide a capacitance reactance with the probe electrode which modulates the frequency of the oscillator output signal. The modulated oscillator output signal is passed to a frequency sensitive phase detector which process the output signal from the oscillator to provide an electrical signal proportional to the described changes and the related running clearance. Such a signal may then be utilized in a readout comprising audio, visual, or recording means. The rather rudimentary electrical circuit as described is satisfactory to show operativeness and effectiveness of probe 14 of this invention.

Figure 4:
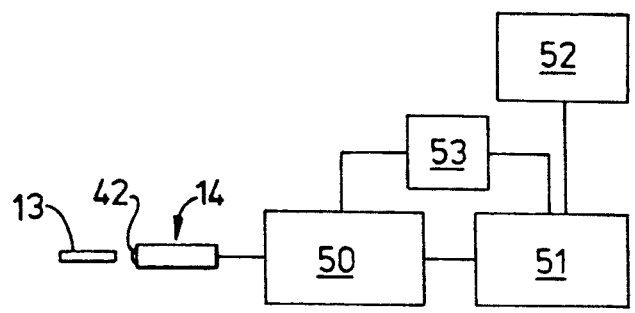
FIG. 4 is a schematic block diagram of an electrical measuring circuit for the probe of FIG. 2.

The above described rudimentary circuit may be greatly improved by the use of a voltage controlled continuously variable high frequency oscillator and an automatic self correcting circuit as illustrated in FIG. 4.

Referring now to FIG. 4, the improved circuit described comprises a voltage tunable, continuously variable, (as opposed to stepped or digital frequency oscillators) high frequency oscillator 50 which is connected to an appropriate electrical power supply (not shown) so that the combination supplies an electrical signal to electrode 42 of probe 14 through cable 23. The output frequency of oscillator 50 is frequency modulated by capacitance changes between probe electrode 42 and passing blade tips 13 (FIG. 1) and the modulated oscillator signal is passed into a phase detector 51 which processes the changes in frequency as an electrical signal which is proportional to the running clearance of the turbine wheel or gap between the probe electrode and passing blade tips. This signal may then be passed into a suitable data processor 52 where it may be converted to an audio, visual, or recorded readout. Such a signal may also be gainfully employed to initiate appropriate control means which may provide some corrective effect or change in the running clearance.

After initial tuning of the oscillator 50, the frequency output may slightly drift from its original value because of various changes in the measuring system for example, temperature changes which result in changes in the steady state capacitance of the system. Such a drift seriously affects the sensitivity of the system. Since oscillator 50 is a continuously variable voltage tunable oscillator, an electrical feedback correction circuit may be utilized therewith. Such a correction circuit is represented generally and schematically at 53. Briefly, feedback circuit 53 is adapted to sense a drift of the oscillator signal as it appears in the phase detector and passes a resultant generated electrical signal to the voltage control of the oscillator to adjust the output frequency to a slightly different frequency to correct the drift.

The above electrical circuit is described as a frequency modulated, voltage controlled (VCO) oscillator/phase detection circuit. Operation of this circuit at a 10 MHZ center frequency provided a wide band of frequency response for a number of different gas turbine engines of different power ratings.

As previously described the probe and its inductor as well as their cable 23 are a part of a tuned circuit in the oscillator. Such a tuned circuit is sensitive to any capacitance change in the circuit components such as probe 14 and cable 23 which may be brought about by environmental temperature changes, particularly those which affect any dielectric in the system. The probe of this invention in made less sensitive to those changes by means of the water cooling system incorporated in probe head 18, and by means of fixedly supporting probe center conductor 33 concentrically in probe body 17 with air as the dielectric between conductor 33 and body 17, both of which means serve to minimize any significant operational electrical capacitance changes therebetween. As illustrated in FIG. 2 center conductor 33 passes concentrically through a spaced array of electrically insulating mineral material disc 54 which provide a constant maximum separation distance of condutor 33 from probe body 17 for constant capacitance. This constant capacitance feature is further accentuated and supported by having the sensor end of probe 14 metallize braze sealed at potential gas leak sites to avoid penetration of combustion gases into the probe body, for example, between insulator 35 and adjoining surfaces of sleeve 36 and probe body 17, and between electrode 42 and insulator 35. A peripheral weld is utilized at flange 40 of sleeve 36.

The clearanceometer system of this invention employs a unique probe member which combines several significant and effective electrical stabilizing features including (1) a water cooled head in which an electrical inductor is fixedly potted with a high thermally conductive epoxy compound 58 (FIG. 2) which assists cooling; (2) a metal/ceramic gas tight braze sealed sensor end with a planar capacitor electrode securely braze bonded to a ceramic insulator; (3) an electrical conductor 33 interconnecting the inductor and the electrode, which is mechanically centrally supported in the probe body with air as the dielectric between the conductor and the probe body; and 4) an electrical circuit for the probe comprising a voltage tunable oscillator and phase detector with an automatic feedback correction circuit for oscillator signal drift.

The effectiveness of the electrical circuit of this invention is increased by locating inductor 24 within probe 14 as opposed to being at oscillator 50. This arrangement increases the sensitivity of the probe and removes the coaxial cable 23 from the measuring circuit. Coaxial cables have been found to be prone to capacitance changes therein due to temperature variations and imposed mechanical stresses during mounting and operation, and accordingly, may deleteriously affect system stability.

Electrical stabilization together with a uniquely cooperative probe and sensing circuit provides a clearanceometer system which is also useful with non-metallic blades such as found in air compressors of gas turbine engines, the tips of which do not serve as capacitor electrodes. For example, the sensor end of probe 14 carries a capacitor electrode 42 (FIG. 3) which is electrically insulated and circumferentially spaced from the probe body 17. Electrode 42 is connected to the central conductor 33 and receives electrical energy from inductor 24 and oscillator 50, whereas, probe body 17 is at electrical ground potential. Consequently an electrical capacitance field is established across the space between electrode 42 and probe body 17 at flange 40 of sleeve 36. During turbine operation non-metallic blade tips pass very closely to and electrically interfere with the electrical capacitance field in the described space because the blade tip is electrically non-conductive or dielectric and the dielectric nature of the blade tip is significantly different from the air dielectric at the probe tip. As a result, the change in electrical capacitance at the non-metal blade tip is sufficient, in the probe and measuring circuit of this invention, to frequency modulate the oscillator signal which may then be processed in the usual manner to provide an electrical signal for audio, visual, or recording means to indicate running clearance. In this connection the system of this invention is particularly applicable to rotating members whose periphery provides an interrupted surface passing the probe, e.g. tips of a row of blades or vanes or other projections or discontinuities as opposed to a continuous smooth surface such as a rim or band surface.

The probe of this invention is further adapted for ease in demounting and reinstallation. After removal of a probe from a gas turbine engine casing for inspection or repair, it is highly desirable to reinstall the probe in accurate registry with its original position so that no changes are required to reposition fluid cooling conduits or the probe electrical cable. Accordingly, probe 14 is adapted to slide axially into a pad or pedestal mount having an extending threaded external sleeve or nipple as part of the axial passage into the casing. Probe 14 of this invention is fitted with a capture sleeve nut 55 (FIG. 2) which is internally threaded (not shown) to correspond to the threads of the described nipple mount. Capture sleeve nut 55 is freely rotatable but axially restrained by a retaining ring 56 on body 17. Probe body 17 is inserted axially into the described threaded pedestal mount until shoulder 57 on probe body 17 engages the pedestal and then sleeve nut 55 is threaded on the pedestal without any necessity to rotate the probe. Accurate original alignment may be further ascertained by having a small protuberance on the probe which fits into an alignment slot in the pedestal mount when probe 14 is inserted. The precise axial position of the capacitor electrode 42 adjacent a bladed wheel is fixed by shoulder 57 engaging the pedestal mount or by fitting precisely dimensioned sleeve on probe body 17 adjacent shoulder 57 to predetermine the axial penetration of probe 14 into a casing.

While this invention has been disclosed and described with respect to preferred embodiments thereof, it will be apparent to those skilled in the art that various changes and modifications may be made therein without departing from the spirit and scope of the invention as set forth in the appended claims.

What is claimed:

1. An electrical capacitance clearanceometer system adapted to measure the distance between (a) a housing having a rotating member within and closely adjacent said housing with said rotating member having an interrupted peripheral surface and (b) a probe capacitor electrode positioned closely adjacent said interrupted surface, (c) said distance being a functional of electrical capacitance between said probe capacitor electrode and said interrupted surface, comprising in combination
    (a) a hollow cylindrical probe body having a hollow head with an electrical inductor therein at one end and a gas tight composite structure sensor assembly in an open bore at an opposite end of said hollow cylindrical body,
    (b) said sensor assembly comprising
        1. a generally cylindrical electrically insulating mineral material insert member having a transverse planar end surface at one end thereof,
        2. a planar capacitor probe electrode securely braze bonded to said planar surface of said insert member in planar abutting relationship,
        3. said electrode being radially inwardly spaced from the periphery of said planar surface of said insert member,
        4. said insert member being circumferentially retained in said open bore end of said hollow cylindrical probe member,
        5. a central conductor in said probe electrically interconnecting said capacitor electrode and an output of said inductor,
        6. an electrical coaxial cable connected into said probe to conduct an electrical signal to said inductor and said central conductor,
    (c) and an electrical capacitance circuit connected to said inductor in said probe through said coaxial cable, said circuit comprising 1. a voltage controlled continuously variable high frequency oscillator having a high frequency output signal,
2. said oscillator, inductor, and said capacitor electrode electricaly interconnected to provide an electrical signal to sad capacitor electrode such that electrical capacitance changes between said capacitor electrode and said interrupted surface modulate the frequency of said oscillator output signal frequency,
3. an electrical phase detector connected to said oscillator to transform said modulated signal into an electrical signal proportional to the electrical capacitance and distance between said capacitor electrode and said interrupted surface,
4. an electrical feedback circuit interconnecting said oscillator and phase detector to sense a drift in said oscillator output signal from a predetermined value and passing a resultant generated electrical signal to a voltage controller in said oscillator to adjust said output signal to a different signal to correct said drift.

2. The invention as recited in claim 1 wherein an axial spaced array of electrical insulating disc members support said central conductor coaxially in said probe body.

3. The invention as recited in claim 1 wherein said insert member is circumferentially retained in said open bore end by a transition metal sleeve internally braze bonded to said insert and externally attached to said probe body each in gas tight relationship.

4. The invention as recited in claim 3 wherein said sleeve is Kovar alloy and said insert is $Al_2O_3$.

5. The invention as recited in claim 1 wherein said inductor is a toroid shaped inductor.

6. The invention as recited in claim 5, wherein said inductor is potted in said hollow head with a high thermal conductive epoxide compound.

7. The invention as recited in claim 6 wherein said toroid inductor is potted in said hollow head in a position having its plane parallel and coincident with the longitudinal axis of said cylindrical probe body.

8. The invention as recited in claim 6 wherein said hollow head is encircled with a fluid coolant manifold for circulation of a coolant fluid therein to limit the temperture of said inductor.

9. A clearanceometer capacitive probe comprising in combination
(a) a narrow hollow cylindrical body having an expanded hollow head at one end of said body and an open end at the other end,
(b) an electrical inductor in said hollow head,
(c) a capacitance sensor assembly in said open end, said capacitance sensor assembly comprising,
  1. a flanged sleeve member,
  2. a cylindrical electrically insulating insert member having a transverse planar surface at one end and braze bonded circumferentially in said sleeve with said planar surface closely adjacent said sleeve flange,
  3. said sleeve with said insulator therein inserted in said open bore with the flange of said sleeve abutting said open end of said cylindrical body and welded thereto in gas tight relationship,
  4. and an electrode assembly bonded to said insulator member comprising,
    (a) a metal planar capacitor electrode section,
    (b) a hollow stem member projecting perpendicularly and concentrically from said electrode section,
    (c) said insert having a bore therethrough to slidingly engage said electrode stem with said planar section abutting said insulator in planar abutting braze bonded relationship,
    (d) and a central conductor coaxially positioned in said cylindrical body with one end electrically connected to said inductor in said hollow head and the other end inserted in and brazed in the said hollow stem of said electrode section.

10. The invention as recited in claim 9 wherein
(a) said body comprises an Fe, Ni, Cr alloy,
(b) said insert comprises $Al_2O_3$,
(c) said electrode assembly comprises an Fe, Ni, Co, Mn
(d) said flanged sleeve comprises an Fe, Ni, Co, Mn alloy.

11. The invention as recited in claim 9 wherein an electrical coaxial cable having a center conductor with a surrounding metal sheath spaced therefrom is connected into said probe to have its center conductor connected to said inductor, the space between said sheath said center conductor being filled with $SiO_2$ electrical insulation of a high dielectric constant.

12. An electrical capacitance clearanceometer system adapted to measure the distance between (a) a housing having a rotating member within and closely adjacent said housing with said rotating member having an interrupted peripheral surface and (b) a probe capacitor electrode positioned closely adjacent said interrupted surface, (c) said distance being a function of electrical capacitance between said probe capacitor electrode and said interrupted surface, comprising in combination
(a) a hollow cylindrical probe body having a hollow head with an electrical inductor therein at one end and a gas tight composite structure sensor assembly in an open bore at an opposite end of said hollow cylindrical body, said inductor having a toroid shape, said inductor being potted in said hollow head with a high thermal conductive epoxide compound,
(b) said sensor assembly comprising
  1. a generally cylindrical electrically insulating mineral material insert member having a transverse planar end surface at one end thereof,
  2. a planar capacitor probe electrode securely braze bonded to said planar surface of said insert member in planar abutting relationship,
  3. said electrode being radially inwardly spaced from the periphery of said planar surface of said insert member,
  4. said insert member being circumferentially retained in said open bore end of said hollow cylindrical probe member,
  5. a central conductor in said probe electrically interconnecting said capacitor electrode and an output of said inductor,
  6. an electrical coaxial cable connected into said probe to conduct an electrical signal to said inductor and said central conductor,
(c) and an electrical capacitance circuit connected to said inductor in said probe through said coaxial cable, said circuit comprising
  1. a voltage controlled continuously variable high frequency oscillator having a high frequency output signal,
  2. said oscillator, inductor, and said capacitor electrode electrically interconnected to provide an elecrical signal to said capacitor electrode such that electrical capacitance changes between said capacitor electrode and said interrupted surface modulate the frequency of said oscillator output signal frequency, 3. an electrical phase detector connected to said oscillator to transform said modulated signal into an electrical signal proportional to the electrical capacitance and distance between said capacitor electrode and said interrupted surface.

13. The invention as recited in claim 12 wherein said toroid inductor is potted in said hollow head in a position having its plane parallel and coincident with the longitudinal axis of said cylindrical probe body.

14. The invention as recited in claim 12 wherein said hollow head is encircled with a fluid coolant manifold for circulation of a coolant fluid therein to limit the temperature of said inductor.

* * * * *